(12) United States Patent
Thomas et al.

(10) Patent No.: US 9,969,882 B2
(45) Date of Patent: May 15, 2018

(54) POLYAMIDE MOLDING COMPOUNDS AND MOLDED ARTICLES PRODUCED THEREFROM

(71) Applicant: EMS-PATENT AG, Domat/Ems (CH)

(72) Inventors: Oliver Thomas, Domat/Ems (CH); Nikolai Lamberts, Bonaduz (CH); Botho Hoffmann, Domat/Ems (CH); Andreas Bayer, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 66 days.

(21) Appl. No.: 14/915,031

(22) PCT Filed: Aug. 8, 2014

(86) PCT No.: PCT/EP2014/067126
§ 371 (c)(1),
(2) Date: Feb. 26, 2016

(87) PCT Pub. No.: WO2015/028292
PCT Pub. Date: Mar. 5, 2015

(65) Prior Publication Data
US 2016/0280914 A1 Sep. 29, 2016

(30) Foreign Application Priority Data
Aug. 29, 2013 (DE) .................. 10 2013 217 241

(51) Int. Cl.
| | |
|---|---|
| C08L 77/02 | (2006.01) |
| C08K 3/00 | (2018.01) |
| C08G 69/26 | (2006.01) |
| C08L 77/06 | (2006.01) |
| C08K 3/22 | (2006.01) |

(52) U.S. Cl.
CPC ............ *C08L 77/02* (2013.01); *C08G 69/265* (2013.01); *C08K 3/0033* (2013.01); *C08K 3/0041* (2013.01); *C08L 77/06* (2013.01); *C08K 2003/221* (2013.01); *C08K 2003/2213* (2013.01); *C08L 2201/08* (2013.01); *C08L 2205/02* (2013.01); *C08L 2205/025* (2013.01)

(58) Field of Classification Search
CPC ....................................................... C07L 77/02
See application file for complete search history.

(56) References Cited

U.S. PATENT DOCUMENTS

| | | | |
|---|---|---|---|
| 5,283,291 A | 2/1994 | Hahn et al. | |
| 7,723,411 B2 | 5/2010 | Schneider | |
| 8,022,170 B2 | 9/2011 | Hoffman et al. | |
| 8,268,956 B2 | 9/2012 | Bühler et al. | |
| 8,383,244 B2 | 2/2013 | Bayer et al. | |
| 8,404,323 B2 | 3/2013 | Pfleghar et al. | |
| 8,410,206 B2 | 4/2013 | Berkei et al. | |
| 8,586,662 B2 | 11/2013 | Harder et al. | |
| 8,604,120 B2 | 12/2013 | Stoppelmann et al. | |
| 9,109,115 B2 | 8/2015 | Bühler | |
| 9,133,322 B2 | 9/2015 | Roth et al. | |
| 2009/0099288 A1 | 4/2009 | Berkei et al. | |
| 2012/0237708 A1 | 9/2012 | Caviezel et al. | |
| 2012/0321829 A1* | 12/2012 | Bayer .................... | C08G 69/36 428/36.9 |
| 2013/0317168 A1 | 11/2013 | Bühler | |
| 2014/0171573 A1 | 6/2014 | Bayer et al. | |
| 2015/0218374 A1 | 8/2015 | Thomas et al. | |
| 2015/0284531 A1 | 10/2015 | Aepli et al. | |
| 2015/0291795 A1 | 10/2015 | Aepli | |
| 2015/0352765 A1 | 12/2015 | Hoffmann et al. | |

FOREIGN PATENT DOCUMENTS

| | | | | |
|---|---|---|---|---|
| CN | 102827471 A | 12/2012 | | |
| EP | 0 310 924 A2 | 4/1989 | | |
| EP | 1 162 236 A1 | 12/2001 | | |
| EP | 1162236 A1 * | 12/2001 | ............. | C08L 77/00 |
| EP | 1 832 624 A1 | 9/2007 | | |
| EP | 2 535 365 A1 | 12/2012 | | |
| GB | 904972 A | 9/1962 | | |
| JP | S56-10553 A | 2/1981 | | |
| JP | S60-208357 A | 10/1985 | | |
| JP | 2012-136620 A | 7/2012 | | |
| JP | 2013-1906 A | 1/2013 | | |
| WO | WO 00/32693 A1 | 6/2000 | | |

OTHER PUBLICATIONS

European Patent Office, International Search Report in International Application PCT/EP2014/067126 (dated Nov. 3, 2014).
European Patent Office, Written Opinion in International Application PCT/EP2014/067126 (dated Nov. 3, 2014).
International Bureau of WIPO, International Preliminary Report on Patentability in International Application PCT/EP2014/067126 (dated Mar. 1, 2016).
State Intellectual Property Office of People's Republic of China, First Office Action in Chinese Application No. 201480047972.4 (dated Feb. 4, 2017).
State Intellectual Property Office of People's Republic of China, Evidence of Common Knowledge in support of Office Action in Chinese Application No. 201480047972.4 (dated Feb. 4, 2017).
State Intellectual Property Office of People's Republic of China, Second Office Action in Chinese Application No. 201480047972.4 (dated Jun. 26, 2017).
State Intellectual Property Office of People's Republic of China, First Search Report in Chinese Application No. 201480047972.4 (dated Jan. 20, 2017).

(Continued)

*Primary Examiner* — Arrie L Reuther
(74) *Attorney, Agent, or Firm* — Leydig, Voit & Mayer, Ltd.

(57) ABSTRACT

The present invention relates to polyamide molding compounds which have an improved resistance to heat-aging and comprise the following compositions: (A) 25 to 84.99 wt.-% of at least one polyamide, (B) 15 to 70 wt.-% of at least one filler and reinforcing means, (C) 0.01 to 5.0 wt.-% of at least one inorganic radical interceptor, (D) 0 to 5.0 wt.-% of at least one heat stabilizer which is different from the inorganic free-radical scavenger under (C), and (E) 0 to 20.0 wt.-% of at least one additive. The invention further relates to molded articles produced from these polyamide molding compounds as components in the automobile or electrics/electronics sector.

12 Claims, No Drawings

(56) References Cited

OTHER PUBLICATIONS

State Intellectual Property Office of People's Republic of China, Supplementary Search Report in Chinese Application No. 201480047972.4 (dated Jun. 15, 2017).
*Plastic Industry Manual, Polyamide*, First Edition, Zhihan Peng, Zupei Shi, Editors; Chemical Industry Press, Beijing, China (2001); p. 8 (originally cited by the Chinese Office Action dated Jun. 26, 2017 in Application No. 201480047972.4).
U.S. Appl. No. 10/536,494, filed Oct. 5, 2006.
U.S. Appl. No. 10/553,259, filed Jul. 24, 2006.
U.S. Appl. No. 11/950,964, filed Dec. 5, 2007.
U.S. Appl. No. 12/743,097, filed May 14, 2010.
U.S. Appl. No. 13/045,682, filed Mar. 11, 2011.
U.S. Appl. No. 13/186,785, filed Jul. 20, 2011.
U.S. Appl. No. 13/421,541, filed Mar. 15, 2012.
U.S. Appl. No. 13/481,451, filed May 25, 2012.
U.S. Appl. No. 13/800,102, filed Mar. 13, 2013.
U.S. Appl. No. 13/898,099, filed May 20, 2013.
U.S. Appl. No. 13/971,376, filed Aug. 20, 2013.
U.S. Appl. No. 14/205,667, filed Mar. 12, 2014.
U.S. Appl. No. 14/607,676, filed Jan. 28, 2015.
U.S. Appl. No. 14/663,105, filed Mar. 19, 2015.
U.S. Appl. No. 14/681,669, filed Apr. 8, 2015.
U.S. Appl. No. 14/729,277, filed Jun. 3, 2015.
Japan Patent Office, Notification of Reasons for Refusal in Japanese Patent Application No. 2016-537205 (dated Mar. 14, 2018).

* cited by examiner

POLYAMIDE MOLDING COMPOUNDS AND MOLDED ARTICLES PRODUCED THEREFROM

CROSS-REFERENCE TO RELATED APPLICATIONS

This patent application is the U.S. national phase of International Application No. PCT/EP2014/067126, filed on Aug. 8, 2014, which claims the benefit of German Patent Application No. 10 2013 217 241.9, filed Aug. 29, 2013, the disclosures of which are incorporated herein by reference in their entireties for all purposes.

The present invention relates to polyamide moulding compounds having improved heat-ageing resistance and to moulded articles produced herefrom.

Thermoplastic polyamides are frequently used in the form of glass fibre-reinforced moulding compounds as construction materials for components which are subjected to increased temperatures during their lifespan, the result being thermooxidative damage. By the addition of known heat stabilisers, the occurrence of thermooxidative damage can in fact be delayed but not permanently prevented, which is expressed for example in a decrease in the mechanical characteristic values. Improvement in the heat-ageing resistance of polyamides is extremely desirable since consequently longer lifespans for thermally loaded components can be achieved or the failure risk thereof can be reduced. Alternatively, improved heat-ageing resistance can also enable the use of the components at higher temperatures.

Heat-ageing resistance is still not adequate in the known polyamide moulding compounds, in particular over fairly long thermal loading time periods and at temperatures above 200° C.

Various approaches for improving the heat-ageing resistance are known from the state of the art.

Thus EP 2 535 365 A1 describes a polyamide moulding compound based on partially crystalline, partially aromatic polyamides to which, as heat stabiliser, copper compounds, stabilisers based on secondary aromatic amines or sterically hindered phenols or phosphites or phosphonites are added.

Polyamides which are stabilised against the influences of light and heat are known from GB 904,972. As stabilisers, combinations of hypophosphorous acid and/or hypophosphates in combination with cerium- or titanium salts are described here.

From EP 1 832 624 A1, the use of radical interceptors for stabilising organic polymers against photochemical, thermal, physical or chemically induced degradation is known, cerium dioxide being used here as radical interceptor.

Starting herefrom, it was the object of the present invention to make available polyamide moulding compounds from which the components for the automobile-, electrical- and electronic field can be produced, which components are distinguished, relative to the polyamide moulding compounds known from the state of the art, by improved heat-ageing resistance at temperatures of at least 180° C. At the same time, the components must have sufficient strength or rigidity at fairly high temperatures, in particular above 100° C. Furthermore, a partial object of the present invention resides in providing polyamide moulding compounds which can be identified perfectly without great analytical complexity.

This object is achieved by the polyamide moulding compound having the features of claim 1 and by the moulded article having the features of claim 16. The further dependent claims reveal advantageous developments.

According to the invention, a polyamide moulding compound with the following composition is provided:
(A) 25 to 84.99% by weight of at least one caprolactam-containing polyamide,
(A1) with a caprolactam content of at least 50% by weight and at least one further polyamide (A2),
(B) 15 to 70% by weight of at least one filler and reinforcing means,
(C) 0.01 to 5.0% by weight of at least one inorganic radical interceptor,
(D) 0 to 5.0% by weight of at least one heat stabiliser which differs from the inorganic radical interceptor under (C),
(E) 0 to 20.0% by weight of at least one additive,
components (A) to (E) adding up to 100% by weight.

The moulding compounds according to the invention are surprisingly distinguished by very good heat-ageing resistance over long periods of time. In particular, the tearing strength after 2,000 hours is more than 90% (determined as quotient of the tearing strength values according to ISO 527 at the time 0 (corresponds to 100%) and after the end of storage at 230° C.). After 3,000 hours, the tearing strength is preferably at least 50%, particularly preferably at least 85%.

The breaking elongation after 2,000 hours is 73% (relative to the initial value) or, after 3,000 hours, preferably at least 50% and particularly preferably at least 65% (relative to the initial value).

Preferably, the proportion of component (A) is 37 to 84.9% by weight, particularly preferably 48 to 69.8% by weight.

Relative to 100% by weight for the sum of the proportions of caprolactam-containing polyamide (A1) and of polyamide (A2), the proportion of caprolactam-containing polyamide (A1) is 10 to 40% by weight, preferably 14 to 30% by weight, particularly preferably 20 to 30% by weight and the proportion of polyamide (A2) is 60 to 90% by weight, preferably 70 to 86% by weight, particularly preferably 70 to 80% by weight.

There should be understood by a caprolactam-containing polyamide (A1), according to the invention, a polyamide which is producible by polymerisation of caprolactam or copolymerisation/-polycondensation of caprolactam with further monomers. The caprolactam-containing polymer hence comprises at least 50% by weight of repetition units which are derived from caprolactam.

It is preferred that polyamide (A2) concerns a partially aromatic polyamide selected from the group consisting of PA 4T/4I, PA 4T/6I, PA 5T/5I, PA 6T/6I, PA 6T/6I/6, PA 6T/6, PA 6T/6I/66, PA 6T/MPDMT (MPDMT=MPMDT=polyamide based on a mixture of hexamethylene diamine and 2-methylpentamethylene diamine as diamine component and terephthalic acid as diacid component), PA 6T/66, PA 6T/610, PA 10T/612, PA 10T/106, PA 6T/612, PA 6T/10T, PA 6T/10I, PA 9T, PA 10T, PA 12T, PA 10T/10I, PA 10T/12, PA 10T/11, PA 6T/9T, PA 6T/12T, PA 6T/10T/6I, PA 6T/6I/6, PA 6T/6I/12 and also mixtures thereof or concerns an aliphatic polyamide selected from the group consisting of PA 66, PA 46 or mixtures hereof. If polyamide (A2) comprises caprolactam, the proportion of caprolactam is preferably below 50% by weight, particularly preferably below 40% by weight and particularly preferably in the range of 5 to 30% by weight. In a further preferred embodiment, the caprolactam content in component (A2) is 0 to 30% by weight.

Preferably, the proportion of the at least one inorganic radical interceptor (C) is 0.1 to 3.0% by weight, particularly preferably 0.2 to 2.0% by weight.

Preferably, the inorganic radical interceptor (C) concerns a lanthanoid compound selected from the group consisting of
- fluorides, chlorides, bromides, iodides, oxyhalides, sulphates, nitrates, phosphates, chromates, perchlorates, oxalates, the monochalcogenides of sulphur, selenium and tellurium, carbonates, hydroxides, oxides, trifluoromethanesulphonates, acetylacetonates, alcoholates, 2-ethylhexanoates
- the lanthanoids, lanthanum, cerium, praesodymium, neodymium, promethium, samarium, europium, gadolinium, terbium, dysprosium, holmium, erbium, thulium, ytterbium and lutetium and also
- hydrates of the mentioned salts and also
- mixtures of the mentioned compounds.

Furthermore, it is preferred that the cation of the inorganic radical interceptor (C) has an oxidation number of +III or +IV.

In a preferred embodiment of the invention, there are used as inorganic radical interceptor (C), compounds of cerium, lanthanum or mixtures thereof.

In a particularly preferred embodiment of the invention, compounds of lanthanum are used as inorganic radical interceptor (C).

Preferably, the inorganic radical interceptors (C) are used with a redox partner, preferred redox partners are alkali- and/or alkaline earth metal halides.

Furthermore, the polyamide moulding compound according to the invention is free of metal salts and/or metal oxides of a transition metal of group VB, VIB, VIIB or VIIIB of the periodic table.

For particular preference, cerium tetrahydroxide, lanthanum trihydroxide or mixtures thereof are used as inorganic radical interceptor (C).

For particular preference, lanthanum trihydroxide is used as inorganic radical interceptor (C).

The polyamide (A2) contained according to the invention preferably has a melting point in the range of 250 to 340° C., particularly preferably in the range of 280 to 330° C. and/or a glass transition temperature in the range of 50 to 140° C., preferably in the range of 110 to 140° C., particularly preferably in the range of 115 to 135° C.

A further preferred embodiment provides that the at least one further polyamide (A2) is partially aromatic and has a solvent viscosity $\eta_{rel}$ of at most 2.6, preferably of 1.45 to 2.3, further preferably of 1.5 to 2.0, particularly preferably of 1.5 to 1.8, measured on a solution of 0.5 g polyamide (A2) in 100 ml m-cresol at 20° C.

Preferably, the at least one further polyamide (A2) is partially aromatic and produced from
a) dicarboxylic acids which, relative to the total quantity of dicarboxylic acids, comprise at least 50% by mol of terephthalic acid,
b) diamines which, relative to the total quantity of diamines, comprise at least 80% by mol of aliphatic diamines with 4 to 18 carbon atoms, preferably 6 to 12 carbon atoms, and also
c) possibly lactams and/or aminocarboxylic acids.

A further preferred embodiment provides that the at least one further polyamide (A2) is partially aromatic and produced from
a) 50 to 100% by mol of terephthalic acid and/or naphthalene dicarboxylic acid and also 0 to 50% by mol of at least one aliphatic dicarboxylic acid with 6 to 12 carbon atoms, and/or 0 to 50% by mol of at least one cycloaliphatic dicarboxylic acid with 8 to 20 carbon atoms, and/or 0 to 50% by mol of isophthalic acid, relative to the total quantity of dicarboxylic acids
b) 80 to 100% by mol of at least one aliphatic diamine with 4 to 18 carbon atoms, preferably with 6 to 12 carbon atoms and also 0 to 20% by mol of at least one cycloaliphatic diamine, such as e.g. PACM, MACM, IPDA, preferably with 6 to 20 carbon atoms, and/or 0 to 20% by mol of at least one araliphatic diamine, MXDA and PXDA, relative to the total quantity of diamines and also
c) 0 to 20% by mol of aminocarboxylic acids and/or lactams respectively with 6 to 12 carbon atoms.

The content of caprolactam of the caprolactam-containing polyamide (A1) is preferably 60 to 100% by weight, particularly preferably 70 to 95% by weight. Preferably, the at least one caprolactam-containing polyamide (A1) has a solvent viscosity $\eta_{rel}$, in the range of 1.6 to 3.0, preferably in the range 1.7 to 2.5, in particular in the range of 1.8 to 2.2, measured on a solution of 1.0 g polyamide (A1) in 100 ml 96% sulphuric acid at 20° C.

Preferably, the proportion of the at least one filler and reinforcing means (B) is 15 to 60% by weight, particularly preferably 30 to 50% by weight.

The filler and reinforcing means (B) used according to the invention is preferably selected from the group consisting of
a) glass- and/or carbon fibres, preferably with a length in the range of 0.2 to 50 mm and/or a diameter of 5 to 40 μm and/or endless fibres (rovings),
b) particulate fillers, preferably mineral fillers based on natural and/or synthetic layer silicates, talc, mica, silicate, quartz, titanium dioxide, wollastonite, kaolin, amorphous silicic acids, magnesium carbonate, magnesium hydroxide, chalk, lime, feldspar, barium sulphate, solid- or hollow glass balls or ground glass, permanently magnetic or magnetisable metal compounds and/or alloys and/or mixtures hereof and also
c) mixtures hereof.

It is further preferred that the at least one heat stabiliser (D) is selected from the group consisting of
a) compounds of mono- or bivalent copper, e.g. salts of mono- or bivalent copper with inorganic or organic acids or mono- or bivalent phenols, the oxides of mono- or bivalent copper, or complex compounds of copper salts with ammonia, amines, amides, lactams, cyanides or phosphines, preferably Cu(I)- or Cu(II) salts of hydrohalogen acids, of hydrocyanic acids or the copper salts of aliphatic carboxylic acids, particularly preferably CuCl, CuBr, CuI, CuCN and $Cu_2O$, $CuCl_2$, $CuSO_4$, CuO, copper(II)acetate or copper(II)stearate,
b) stabilisers based on secondary aromatic amines,
c) stabilisers based on sterically hindered phenols
d) phosphites and phosphonites and also
e) mixtures hereof.

Preferably, the proportion of the least one heat stabiliser (D) is 0.01 to 5.0% by weight, preferably 0.03 to 3.0% by weight and particularly preferably 0.05 to 1.0% by weight.

If the heat stabilisers (D) are metals or metal compounds, these are preferably used in a low oxidation state, in the case of copper stabilisers the oxidation state +I is preferred.

A preferred embodiment provides that, in addition to the inorganic radical interceptor which is preferably a cerium-containing and/or lanthanum-containing compound and particularly preferably cerium tetrahydroxide and/or lanthanum trihydroxide, a compound of mono- or bivalent copper is contained for heat stabilisation. Surprisingly, strong synergistic effects, which can be attributed presumably to the fact that the combination increases the reactivity of both metals and hence the activity thereof as heat stabiliser, are hereby revealed.

A further preferred embodiment provides that the inorganic radical interceptor, preferably a cerium-containing and/or lanthanum-containing compound, particularly preferably cerium tetrahydroxide and/or lanthanum trihydroxide, is combined with a stabiliser based on secondary aromatic amines. Particularly preferred examples of stabilisers which can be used according to the invention and based on secondary aromatic amines are adducts of phenylene diamine with acetone (Naugard A), adducts of phenylene diamine with linolene, Naugard 445, N,N'-dinaphthyl-p-phenylene diamine, N-phenyl-N'-cyclohexyl-p-phenylene diamine, N,N'-diphenyl-p-phenylene diamine or mixtures of two or more thereof.

A further preferred embodiment provides that the inorganic radical interceptor, preferably a cerium-containing and/or lanthanum-containing compound, and particularly preferably cerium tetrahydroxide and/or lanthanum trihydroxide, is combined with a stabiliser based on sterically hindered phenols. Preferred examples of stabilisers which can be used according to the invention and based on sterically hindered phenols are N,N'-hexamethylene-bis-3-(3,5-di-tert-butyl-4-hydroxyphenyl)-propionamide, bis-(3,3-bis-(4'-hydroxy-3'-tert-butylphenyl)-butanoic acid)-glycol ester, 2,1'-thioethylbis-(3-(3,5-di-tert-butyl-4-hydroxyphenyl)-propionate, 4-4'-butylidene-bis-(3-methyl-6-tert-butylphenol), triethyleneglycol-3-(3-tert-butyl-4-hydroxy-5-methylphenyl)-propionate or mixtures of two or more of these stabilisers.

A further preferred embodiment provides that the inorganic radical interceptor, preferably a cerium-containing and/or lanthanum-containing compound, particularly preferably cerium tetrahydroxide and/or lanthanum trihydroxide, is combined with phosphites and/or phosphonites as heat stabiliser. Preferred phosphites and phosphonites are triphenylphosphite, diphenylalkylphosphite, phenyldialkylphosphite, tris(nonylphenyl)phosphite, trilaurylphosphite, trioctadecylphosphite, distearylpentaerythritoldiphosphite, tris(2,4-di-tert-butylphenyl)phosphite, diisodecylpentaerythritoldiphosphite, bis(2,4-di-tert-butylphenyl) pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6-tris-(tert-butylphenyl)pentaerythritoldiphosphite, tristearylsorbitoltriphosphite, tetrakis(2,4-di-tert-butylphenyl)-4,4'-biphenylenediphosphonite, 6-isooctyloxy-2,4,8,10-tetra-tert-butyl-12H-dibenzo-[d,g]-1,3,2-dioxaphosphocine, 6-fluoro-2,4,8,10-tetra-tert-butyl-12-methyl-dibenzo[d,g]-1,3,2-dioxaphosphocine, bis(2,4-di-tert-butyl-6-methylphenyl)methylphosphite and bis(2,4-di-tert-butyl-6-methylphenyl)ethylphosphite. Particularly preferred are tris[2-tert-butyl-4-thio(2'-methyl-4'-hydroxy-5'-tert-butyl)-phenyl-5-methyl]phenylphosphite and tris(2,4-di-tert-butylphenyl) phosphite (Hostanox® PAR24: commercial product of the company Clariant, Basle).

Furthermore, also combinations of inorganic radical interceptors with a plurality of compounds of group a) to d) are of course possible.

The moulding compounds according to the invention can comprise further additives (E), such as e.g. from the group of light-protection agents, UV stabilisers, UV absorbers or UV blockers, lubricants, colourants, nucleation agents, metallic pigments, antistatic agents, conductivity additives, mould-release agents, flame-retardants, optical brighteners, impact strength modifiers or mixtures of the mentioned additives. As antistatic agents, e.g. carbon black and/or carbon nanotubes can be used in the moulding compounds according to the invention. The use of carbon black can however serve also for improving the black colouration of the moulding compound. The moulding compound can however also be free of metallic pigments. The additives (E) in the sense of the present invention are different from the inorganic radical interceptors (C). Inorganic compounds which act as radical interceptors are explicitly excluded as additives (E). Additives (E) in 0.01 to 20% by weight are preferred, particularly preferred in 0.1 to 15% by weight and preferred in particular in 0.5 to 10% by weight.

Preferably, the polyamide moulding compound is free of hypophosphorous acid, hypophosphates and also cerium dioxide. In addition, preferably no metal salts and/or metal oxides of a transition metal of the group VB, VIB, VIIB or VIIIB of the periodic table are added to the moulding compound.

A further advantage of the polyamide moulding compounds according to the invention resides in the fact that the use thereof in components can be detected with simple analytical methods, such as e.g. XFA (X-ray fluorescence analysis), ICP (ion-coupled plasma) or EDX (energy dispersive X-ray). By means of the inorganic radical interceptors (C), in particular by means of the lanthanoids La, Ce, Pr, Nd, Pm, Sm, Eu, Gd, Tb, Dy, Ho, Er, Tm, Yb, Lu and mixtures thereof, the detection limit of which is at <100 ppm, a fingerprint of the moulding compound which enables unequivocal identification can be produced.

According to the invention, likewise moulded articles which are producible from a polyamide moulding compound, as described previously, are provided. These moulded articles preferably have the form of a component for the automobile- or electrical/electronic field, in particular cylinder head covers, engine covers, housings for charge coolers, charge cooler valves, suction pipes, suction manifolds, connectors, toothed wheels, ventilator wheels, cooling water tanks, housing or housing part for heat exchangers, coolant coolers, charge coolers, thermostat, water pump, heating unit, attachment parts, in the form of an electrical or electronic component, a circuit board, a part of a circuit board, a housing component, a foil, a line, in particular in the form of a switch, a distributor, a relay, a resistor, a capacitor, a coil, a lamp, a diode, an LED, a transistor, a connector, a controller, a memory and/or a sensor.

For production of the polyamide moulding compound, the components are mixed on conventional compounding machines, such as e.g. single or twin-shaft extruders or screw kneaders. The components are thereby conveyed individually via gravimetric metering scales into the feed or supplied in the form of a dry blend. The fillers or reinforcing means are preferably metered into the polymer melt via side feeders.

If additives are used, these can be introduced directly or in the form or a master batch. The carrier material of the master batch preferably concerns a polyolefin or a polyamide.

The dried granulates and possibly further additives are mixed together for the dry blend production. This mixture is homogenised for 10-40 minutes by means of a tumble mixer, drum hoop mixer or tumble dryer. In order to avoid moisture absorption, this can be effected under a dried protective gas.

The compounding is effected at set cylinder temperatures of 230° C. to 340° C. In front of the nozzle, a vacuum can be applied or it can be atmospherically degassed. The melt is discharged in strand form, cooled in the water bath at 10 to 80° C. and subsequently granulated. The granulate is dried for 12 to 24 hours at 80 to 120° C. under nitrogen or in a vacuum to a water content of below 0.1% by weight.

Processing of the polyamide moulding compounds during injection moulding is effected with cylinder temperatures of 250° C. to 340° C. and mould temperatures of 80° C. to 140° C.

The subject according to the invention is intended to be explained in more detail with reference to the subsequent examples without wishing to restrict said subject to the specific embodiments shown here.

Production of the Moulding Compounds and Test Pieces

The moulding compounds for example E1 according to the invention and also for the comparative example CE1 were produced on a twin-shaft extruder by the company Werner and Pfleiderer type ZSK25. The constituent amounts of starting substances in weight percent (% by weight) indicated in table 2, relative to 100% by weight of the total moulding compound, were compounded in the twin-shaft extruder. The polyamide granulates were metered into the feed zone together with the additives as dry blend, whilst the glass fibre was metered into the polymer melt via side feeder 3 housing units in front of the nozzle. The housing temperature was set as rising profile to 280° C. 10 kg throughput was achieved at 150 rpm. After cooling the strands in the water bath, granulation and drying at 120° C. for 24 hours, injection-moulding of the compounds to form ISO test pieces was effected. On an injection-moulding machine, Arburg Allrounder 320-210-750, at cylinder temperatures of 275° C. to 290° C. of zones 1 to 4 and with a mould temperature of 100° C., injection-moulding took place.

For the remaining examples and comparative examples, the housing temperature was set as rising profile to 330° C. For the injection moulding, cylinder temperatures of 310° C. to 330° C. of zones 1 to 4 and mould temperature of 130° C. were used.

In table 1, the chemicals used for the examples and comparative examples are listed.

TABLE 1

| Material | Trade name | Supplier | rel. viscosity | $H_2O$ content [% by weight] |
|---|---|---|---|---|
| PA 66 | Radipol A45 | Radici Chimica, (I) | $1.75^b$ | |
| PA 6T/66 (55:45) | Grivory XE 3774 | EMS-CHEMIE AG (CH) | $1.63^b$ | <01 |
| PA 6 | Grilon A28 | EMS-CHEMIE AG (CH) | $2.65^a$ | <0.1 |
| cerium tetrahydroxide | — | TREIBACHER INDUSTRIE AG (AT) | — | — |
| lanthanum trihydroxide | — | TREIBACHER INDUSTRIE AG (AT) | — | — |
| copper iodide | — | DSM Andeno (NL) | — | — |
| Ca-stearate | Ligastar CA 800 | Greven (DE) | — | — |
| KI/Ca-stearate (ratio 98:2) | — | AJAY Europe S.A.R.L. (FR)$^c$ | — | — |
| antioxidant | Flexamin G | Adivant (US) | — | — |
| colourant | Euthylenschwarz 00-6005C4 | BASF (DE) | — | — |
| glass fibres | Vetrotrex 995 EC10-4.5 | OCV (FR) | — | — |

$^a$determined according to ISO 307 (1.0 g polyamide in 100 ml 96% sulphuric acid), calculation of the relative viscosity (RV) according to RV = t/t0 following section 11 of the standard;
$^b$determined according to ISO 307 (0.5 polyamide in 100 ml m-cresol), calculation of the relative viscosity (RV) according to RV = t/t0 following section 11 of the standard;
$^c$supplier of KI, mixing with Ca-stearate effected at EMS.

Table 2 shows the composition of examples E1 to E3 and comparative examples CE1 to CE4.

TABLE 2

| Composition | E1 | E2 | E3 | CE1 | CE2 | CE3 | CE4 |
|---|---|---|---|---|---|---|---|
| PA 66 | 53.2 | — | — | 53.5 | — | — | — |
| PA 6T/66 | — | 50.3 | 50.6 | — | 67.2 | 68.0 | 50.8 |
| PA 6 | 13.405 | 16.9 | 16.9 | 13.405 | — | — | 16.9 |
| cerium tetrahydroxide | 0.3 | 0.5 | — | — | 0.5 | — | — |
| lanthanum trihydroxide | — | — | 0.2 | — | — | — | — |
| copper iodide | 0.035 | 0.035 | 0.035 | 0.035 | 0.035 | 0.035 | 0.035 |
| KI/Ca-stearate (ratio 98:2) | 0.21 | 0.3 | 0.3 | 0.21 | 0.3 | — | 0.3 |
| Ca-stearate | 0.5 | — | — | 0.5 | — | — | — |
| antioxidant | 0.35 | — | — | 0.35 | — | — | — |
| colourant | 2.0 | 2.0 | 2.0 | 2.0 | 2.0 | 2.0 | 2.0 |
| glass fibres | 30 | 30 | 30 | 30 | 30 | 30 | 30 |

In tables 3 and 4 the mechanical properties after heat storage at 230° C. and varying duration of the heat storage are listed.

TABLE 3

|  | E1 | E2 | E3 | CE1 | CE2 | CE3 | CE4 |
|---|---|---|---|---|---|---|---|
| Mechanical properties (after 0 h) | | | | | | | |
| modulus of elasticity in tension [MPa] | 8509 | 9251 | 9750 | 10459 | 10033 | 9621 | 9380 |
| tearing strength [MPa] | 155 | 168 | 179 | 164 | 189 | 177 | 165 |
| breaking elongation [%] | 3.0 | 2.5 | 2.6 | 2.2 | 2.8 | 2.7 | 2.7 |
| Mechanical properties (after 250 h) | | | | | | | |
| modulus of elasticity in tension [MPa] | 8668 | n.d. | n.d. | 9934 | n.d. | n.d. | n.d. |
| tearing strength [MPa] | 136 | n.d. | n.d. | 155 | n.d. | n.d. | n.d. |
| breaking elongation [%] | 2.3 | n.d. | n.d. | 2.5 | n.d. | n.d. | n.d. |
| Mechanical properties (after 500 h) | | | | | | | |
| modulus of elasticity in tension [MPa] | 8567 | n.d. | n.d. | 9931 | n.d. | n.d. | n.d. |
| tearing strength [MPa] | 137 | n.d. | n.d. | 115 | n.d. | n.d. | n.d. |
| breaking elongation [%] | 2.5 | n.d. | n.d. | 1.4 | n.d. | n.d. | n.d. |
| Mechanical properties (after 1000 h) | | | | | | | |
| modulus of elasticity in tension [MPa] | 9055 | 10237 | 10328 | 8723 | 9877 | 9155 | 10291 |
| tearing strength [MPa] | 148 | 143 | 154 | 29.4 | 91 | 75 | 138 |
| breaking elongation [%] | 2.2 | 1.7 | 1.8 | 0.4 | 1 | 0.9 | 1.7 |
| Mechanical properties (after 1500 h) | | | | | | | |
| modulus of elasticity in tension [MPa] | 9036 | n.d. | n.d. | — | n.d. | — | n.d. |
| tearing strength [MPa] | 147 | n.d. | n.d. | — | n.d. | — | n.d. |
| breaking elongation [%] | 2.3 | n.d. | n.d. | — | n.d. | — | n.d. |

TABLE 4

|  | E1 | E2 | E3 | CE1 | CE2 | CE3 | CE4 |
|---|---|---|---|---|---|---|---|
| Mechanical properties (after 2000 h) | | | | | | | |
| modulus of elasticity in tension [MPa] | 8962 | 10434 | 10187 | — | 7313 | — | 9992 |
| tearing strength [MPa] | 144 | 124 | 163 | — | 28 | — | 120 |
| tearing strength relative to the initial value [%] | 93 | 74 | 91 | — | 15 | — | 73 |
| breaking elongation [%] | 2.2 | 1.4 | 1.9 | — | 0.7 | — | 1.3 |
| breaking elongation relative to the initial value [%] | 73 | 56 | 73 | — | 25 | — | 48 |
| Mechanical properties (after 3000 h) | | | | | | | |
| modulus of elasticity in tension [MPa] | 8988 | 10383 | 10629 | — | — | — | 10114 |
| tearing strength [MPa] | 141 | 123 | 159 | — | — | — | 110 |
| tearing strength relative to the initial value [%] | 91 | 73 | 89 | — | — | — | 67 |
| breaking elongation [%] | 2.1 | 1.3 | 1.8 | — | — | — | 1.2 |
| breaking elongation relative to the initial value [%] | 70 | 52 | 69 | — | — | — | 44 | n.d. not determined
— if the breaking elongation had dropped below 1% after heat storage, the heat storage was terminated.

The measurements were implemented according to the following standards and on the following test pieces.

Relative Viscosity Polyamide (A1):

The relative viscosity ($\eta_{rel}$) was determined according to DIN EN ISO 307 on solutions of 1.0 g polymer dissolved in 100 ml 96% sulphuric acid at a temperature of 20° C. Calculation of the relative viscosity (RV) according to $RV=t/t_0$ following section 11 of the standard.

Relative Viscosity Polyamide (A2):

The relative viscosity ($\eta_{rel}$) was determined according to DIN EN ISO 307 on solutions of 0.5 g polymer dissolved in 100 ml m-cresol at a temperature of 20° C. Calculation of the relative viscosity (RV) according to $RV=t/t_0$ following section 11 of the standard.

Determination of the Modulus of Elasticity in Tension

Determination of the modulus of elasticity in tension was effected according to ISO 527 with a tensile speed of 1 mm/min on an ISO test bar according to the ISO 3167 standard, Type A with the dimensions 170×20/10×4 mm at a temperature of 23° C.

Determination of the Breaking Strength and Breaking Elongation

Determination of the breaking strength and breaking elongation was effected according to ISO 527 with a tensile speed of 5 mm/min on an ISO test bar according to the ISO 3167 standard, Type A with the dimensions 170×20/10×4 mm at a temperature of 23° C.

Implementation of the Heat Storage

The heat storage was implemented in ventilated, electrically heated single chamber heat cabinets according to IEC 60216-4-1 at 230° C. on ISO test bars (standard: ISO 3167, Type A, 170×20/10×4 mm). After the times indicated in Table 3 and 4, test pieces were removed from the furnace and tested after cooling to 23° C. according to the above-indicated methods.

The invention claimed is:

1. A polyamide moulding compound having the following composition:
   (A) 25 to 84.99% by weight of at least one caprolactam-containing polyamide (A1) with a caprolactam content of at least 50% by weight and at least one further polyamide (A2),
   (B) 15 to 70% by weight of at least one filler and reinforcing means,
   (C) 0.01 to 5.0% by weight of at least one inorganic radical interceptor,
   (D) 0 to 5.0% by weight of at least one heat stabiliser which differs from the inorganic radical interceptor (C), and
   (E) 0 to 20.0% by weight of at least one additive,
   components (A) to (E) adding up to 100% by weight;
   wherein component (A) is formed from 10 to 40% by weight of at least one caprolactam-containing polyamide (A1) and 60 to 90% by weight of at least one polyamide (A2), components (A1) and (A2) adding up to 100% by weight;
   wherein the inorganic radical interceptor (C) is a lanthanoid compound selected from the group consisting of fluorides, chlorides, bromides, iodides, oxyhalides, sulphates, nitrates, phosphates, chromates, perchlorates, oxalates, the monochalcogenides of sulphur, selenium and tellurium, carbonates, hydroxides, trifluoromethanesulphonates, acetylacetonates, alcoholates, and 2-ethylhexanoates of lanthanoid or lanthanoids wherein the lanthanoid or lanthanoids are selected from lanthanum, cerium, praesodymium, neodymium, promethium, samarium, europium, gadolinium, terbium, dysprosium, holmium, erbium, thulium, ytterbium, and lutetium,
   hydrates of the above-mentioned salts, and
   mixtures of the above-mentioned compounds;
   wherein the at least one heat stabiliser (D) is selected from the group consisting of
   a) compounds of mono- or bivalent copper,
   b) stabilisers based on secondary aromatic amines,
   c) stabilisers based on sterically hindered phenols,
   d) phosphites and phosphonites, and
   e) mixtures of any of a), b), c) and d);
   wherein the proportion of the at least one stabiliser (D) is 0.01 to 5.0% by weight.

2. The polyamide moulding compound according to claim 1,
   wherein polyamide (A2) concerns a partially aromatic polyamide selected from the group consisting of PA 4T/4I, PA 4T/6I, PA 5T/5I, PA 6T/6I, PA 6T/6I/6, PA 6T/6, PA 6T/6I/66, PA 6T/MPDMT, PA 6T/66, PA 6T/610, PA 10T/612, PA 10T/106, PA 6T/612, PA 6T/10T, PA 6T/10I, PA 9T, PA 10T, PA 12T, PA 10T/10I, PA 10T/12, PA 10T/11, PA 6T/9T, PA 6T/12T, PA 6T/10T/6I, PA 6T/6I/6, PA 6T/6I/12, and mixtures thereof, or an aliphatic polyamide selected from the group consisting of PA 66, PA 46, and mixtures thereof.

3. The polyamide moulding compound according to claim 1, wherein the at least one polyamide (A2) has a melting point in the range of 250 to 340° C.

4. The polyamide moulding compound according to claim 1, wherein the at least one further polyamide (A2) is partially aromatic and has a solvent viscosity $\eta_{rel}$ of at most 2.6, measured on a solution of 0.5 g polyamide (A2) in 100 ml m-cresol at 20° C.

5. The polyamide moulding compound according to claim 1, wherein the at least one further polyamide (A2) is partially aromatic and produced from
   a) dicarboxylic acids which, relative to the total quantity of dicarboxylic acids, comprise at least 50% by mol of terephthalic acid,
   b) diamines which, relative to the total quantity of diamines, comprise at least 80% by mol of aliphatic diamines with 4 to 18 carbon atoms, and
   c) optionally lactams and/or aminocarboxylic acids.

6. The polyamide moulding compound according to claim 1, wherein the at least one further polyamide (A2) is partially aromatic and is produced from
   a) 50 to 100% by mol of terephthalic acid and/or naphthalene dicarboxylic acid and 0 to 50% by mol of at least one aliphatic dicarboxylic acid with 6 to 12 carbon atoms, and/or 0 to 50% by mol of at least one cycloaliphatic dicarboxylic acid with 8 to 20 carbon atoms, and/or 0 to 50% by mol of isophthalic acid, relative to the total quantity of dicarboxylic acids,
   b) 80 to 100% by mol of at least one aliphatic diamine with 4 to 18 carbon atoms, and 0 to 20% by mol of at least one cycloaliphatic diamine and/or 0 to 20% by mol of at least one araliphatic diamine relative to the total quantity of diamines, and
   c) 0 to 20% by mol of aminocarboxylic acids and/or lactams respectively with 6 to 12 carbon atoms.

7. The polyamide moulding compound according to claim 2, wherein the at least one caprolactam-containing polyamide (A1) has a content of caprolactam of 60% by weight to 100% by weight.

8. The polyamide moulding compound according to claim 1, wherein the at least one caprolactam-containing polyamide (A1) has a solvent viscosity $\eta_{rel}$ in the range of 1.6 to 3.0, measured on a solution of 1.0 g polyamide (A1) in 100 ml 96% sulphuric acid at 20° C.

9. The polyamide moulding compound according to claim 1, wherein the at least one filler and reinforcing means (B) are selected from the group consisting of
   a) glass- and/or carbon fibres,
   b) particulate fillers, and
   c) mixtures thereof.

10. The polyamide moulding compound according to claim 1, wherein the polyamide moulding compound is free of hypophosphorous acid, hypophosphates and cerium dioxide.

11. The polyamide moulding compound according to claim 1, wherein the polyamide moulding compound is free of metal salts and/or metal oxides of a transition metal of the group VB, VIB, VIIB or VIIIB of the periodic table.

12. A component produced from a polyamide moulding compound according to claim 1, wherein the component is a component for the automobile- or electrical/electronic field, cylinder head covers, engine covers, housings for charge coolers, charge cooler valves, suction pipes, suction manifolds, connectors, toothed wheels, ventilator wheels, cooling water tanks, housing or housing part for heat exchangers, coolant coolers, charge coolers, thermostat, water pump, heating unit, attachment parts, in the form of an electrical or electronic component, a circuit board, a part of a circuit board, a housing component, a foil, a line, in particular in the form of a switch, a distributor, a relay, a resistor, a capacitor, a coil, a lamp, a diode, an LED, a transistor, a connector, a controller, a memory or a sensor.

\* \* \* \* \*

UNITED STATES PATENT AND TRADEMARK OFFICE
CERTIFICATE OF CORRECTION

PATENT NO. : 9,969,882 B2
APPLICATION NO. : 14/915031
DATED : May 15, 2018
INVENTOR(S) : Thomas et al.

Page 1 of 1

It is certified that error appears in the above-identified patent and that said Letters Patent is hereby corrected as shown below:

In the Claims

Column 11 (Line 64) Claim 1, Line 27, "acteylacetonates" should read --acetylacetonates--;

Column 12 (Line 13) Claim 1, Line 43, "at least one stabilizer (D)" should read --at least one heat stabilizer (D)--.

Signed and Sealed this
Thirty-first Day of July, 2018

Andrei Iancu
*Director of the United States Patent and Trademark Office*